US012440851B2

(12) United States Patent
Korpijaakko et al.

(10) Patent No.: US 12,440,851 B2
(45) **Date of Patent: *Oct. 14, 2025**

(54) IMPACT CRUSHER, AN UPPER ROTOR AND A HAMMER

(71) Applicant: MAICON ENGINEERING OY, Kauniainen (FI)

(72) Inventors: Tapio Korpijaakko, Kuopio (FI); Marko Reinikainen, Joensuu (FI); Teemu Laasonen, Joensuu (FI)

(73) Assignee: MAICON ENGINEERING OY, Kauniainen (FI)

( * ) Notice: Subject to any disclaimer, the term of this patent is extended or adjusted under 35 U.S.C. 154(b) by 379 days.

This patent is subject to a terminal disclaimer.

(21) Appl. No.: 18/250,857

(22) PCT Filed: Oct. 26, 2021

(86) PCT No.: PCT/FI2021/050717

§ 371 (c)(1),
(2) Date: Apr. 27, 2023

(87) PCT Pub. No.: WO2022/090620

PCT Pub. Date: May 5, 2022

(65) Prior Publication Data

US 2023/0390785 A1 Dec. 7, 2023

(30) Foreign Application Priority Data

Oct. 30, 2020 (FI) ..................................... 20206084

(51) Int. Cl.
*B02C 13/18* (2006.01)
*B02C 13/20* (2006.01)
(Continued)

(52) U.S. Cl.
CPC ...... *B02C 13/1835* (2013.01); *B02C 13/1814* (2013.01); *B02C 13/20* (2013.01);
(Continued)

(58) Field of Classification Search
CPC . B02C 13/1814; B02C 13/1835; B02C 13/20; B02C 13/205; B02C 13/28;
(Continued)

(56) References Cited

U.S. PATENT DOCUMENTS 2,867,387 A * 1/1959 Conley ............... B02C 13/1807 241/294
2,919,864 A * 1/1960 Parmele ................ B02C 13/205 241/300

(Continued)

*Primary Examiner* — Bobby Yeonjin Kim
(74) *Attorney, Agent, or Firm* — S.J. Intellectual Property Ltd.

(57) ABSTRACT

A impact crusher with dual rotors, an upper rotor (30) and a hammer for the impact crusher are disclosed herein. The upper rotor (30) of the impact crusher comprises two discs on top of each other. The upper rotor (30) comprises a plurality of hammers (40) pointing down, to the outer perimeter of the lower rotor (20) discharging the material to be crushed at high speed. Each hammer (40) has a support shaft (41) that extends vertically between the first disc (31) and the second disc (32). The distance between the first disc (31) and the second disc (32) provides torsional structure to the connection between the hammer and the upper rotor (30).

13 Claims, 10 Drawing Sheets

(51) Int. Cl.
*B02C 13/28* (2006.01)
*B02C 19/00* (2006.01)

(52) U.S. Cl.
CPC ............ *B02C 13/205* (2013.01); *B02C 13/28* (2013.01); *B02C 13/2804* (2013.01); *B02C 19/0025* (2013.01)

(58) Field of Classification Search
CPC ............ B02C 13/2804; B02C 19/0025; B02C 19/0037; B02C 13/22; B02C 13/24
See application file for complete search history.

(56) References Cited

U.S. PATENT DOCUMENTS

2007/0241219 A1* 10/2007 Tessier ................ B02C 13/1814 241/83
2015/0209794 A1* 7/2015 Lelas .................. B02C 13/2804 241/27

* cited by examiner

IMPACT CRUSHER, AN UPPER ROTOR AND A HAMMER

BACKGROUND

This disclosure relates to crusher mills, more particularly to impact crushers having rotary hammers. Vertical shaft impact (VSI) crushers may be used to crush for example rock, mining ore, steel slag for separating metal and slags or various recyclable material. One example of impact crushers comprises dual rotors. The material to be crushed is fed though a hollow vertical shaft leading to central portion of a lower rotor. The lower rotor rotates and accelerates centrifugally the material to be discharged at high speed via the lower rotor openings. The lower rotor may comprise a first hammer at the tip of the lower rotor. One example of VSI crushers comprises multiple fixed anvils at the outer perimeter of the crusher, wherein the accelerated material is thrown against the anvils.

In the dual rotor assembly, the upper rotor rotates to opposite direction about the same axis as the lower rotor. The upper rotor comprises hammers extending downward to receive the accelerated material from the lower rotor.

The hammers or fixed anvils face the material being discharged from the lower rotor at high speed providing second impact and further crushing the material.

The upper rotor size may be between 1 and 3 metres. Each hammer may weigh between 10 to 100 kilograms and the upper rotor may rotate at speeds up to 1000 rpm. The upper rotor structure must withstand the forces from heavy objects impacting the hammers and centrifugal forces pulling the hammers. For these reasons the upper rotor structure may become heavy in order to be durable.

The crusher has many wearing components that need to be maintained or replaced periodically. Heavy upper rotor structure may cause maintenance procedures to be difficult. Time consuming maintenance increases the process downtime. Difficult maintenance work may be dangerous to maintenance personnel.

One example of a dual rotor crusher is disclosed in WO2019/141906.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An impact crusher with dual rotors, an upper rotor and a hammer for the impact crusher are disclosed hereinafter. The upper rotor of the impact crusher comprises two discs on top of each other. The upper rotor comprises a plurality of hammers pointing down, towards the outer perimeter of the lower rotor, being configured to receive the accelerated material from the lower rotor to be crushed at high speed. Each hammer has a support shaft that extends vertically between the first disc and the second disc.

The distance between the first disc and the second disc improves structural rigidity of the connection between the hammer and the upper rotor. In the scenario where the support shafts have only single connection to the upper rotor, the single connection point would be susceptible to withstanding the centrifugal force caused by the heavy hammer at the end of the support shaft.

In comparison, the materials used for the first disc and the second disc may be lighter, yet the structure is more durable. The first disc and the second disc form a sandwich structure to the upper rotor.

As the upper rotor structure is lighter and more durable, it is easier to move. In one embodiment the upper rotor structure is tiltable to a service position, opening the crusher structure by separating the upper rotor from the lower rotor.

The service position may be 90 degrees or 180 degrees. This makes maintenance procedures easier, such as replacing wear parts of the hammers.

Each hammer assembly may weigh between 30 . . . 100 kilograms, which makes them cumbersome to handle manually. For example, in the 180 degree service position, the upper rotor wear plates and hammer wear parts are easy, fast and safe to replace. The whole upper rotor is easier, faster and safer to remove and reinstall in this position, when compared against an arrangement with 90 degree service position.

The hammer and its wear parts are designed for easy maintenance. The wear part facing the lower rotor is reversibly connected to the support shaft, to double its lifecycle as the wear parts may not wear evenly. The arrangement of reusing the wear parts saves costs, reduces the part inventory and makes hammer maintenance easier.

Many of the attendant features will be more readily appreciated as they become better understood by reference to the following detailed description considered in connection with the accompanying drawings. The embodiments described below are not limited to implementations which solve any or all the disadvantages of known crushers.

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented in a metal slag crusher, they are provided as an example and not a limitation. As those skilled in the art will appreciate, the present examples are suitable for application in a variety of different types of crushers. In this disclosure, directions such as up, down, below or above refer to the impact crusher being in operational, i.e. crushing position.

Figure 1:
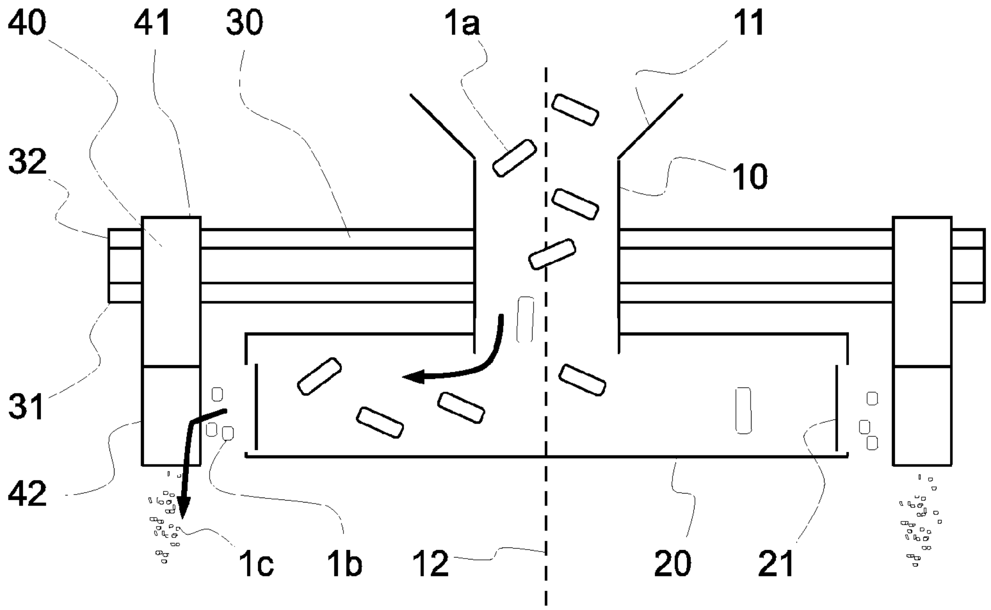
FIG. 1 illustrates schematically a cross-sectional view of one exemplary embodiment of an impact crusher.

FIG. 1 illustrates schematically one exemplary embodiment of an impact crusher having a dual rotor assembly. A flow of material 1*a* to be crushed is received via a funnel 11 to a vertical shaft 10. Non-limiting examples of the material 1*a* are slags, rock and solid recyclable materials. The vertical shaft 10 is arranged to pass through an upper rotor 30, along its rotational axis 12. The flow of material 1*a* passes through the upper rotor 30 via the vertical shaft 10.

A lower rotor 20 rotates about the same axis 12 as the upper rotor 30. In this embodiment, the lower rotor 20 and the upper rotor 30 are not physically connected to the same axis 12, therefore there may be minor deviations in their respective rotational axes 12. The upper rotor 30 is rotated by an upper electric motor and the lower rotor 20 is rotated by a lower electric motor. The lower rotor 20 rotates in opposite direction to the upper rotor 30. The lower rotor 20 is configured to receive the material 1*a* to be crushed from the vertical shaft 10. The lower rotor 20 rotating in the first direction accelerates the flow of material 1*b*. In one exemplary embodiment the material is accelerated to speeds of 60 . . . 80 m/s. As the material 1*a* drops through the vertical shaft 10 to the enclosed lower rotor 20 the centrifugal force throws the material 1*b* against a wear tip 21 configured to the lower rotor 20.

The material 1*b* discharges from the lower rotor 20 into a plurality of hammers 40. Hammers 40 extend down from the upper rotor 30 to the level of lower rotor's outer perimeter and/or to a position to receive the flow of material being discharged from the lower rotor 20. The upper rotor 30 and the hammers 40 rotate in second direction, thereby enhancing the impact of the material 1*b* to the hammers 40. After the impact, the material 1*c* falls from the hammers 40 to be collected outside the impact crusher.

The upper rotor 30 comprises a sandwich structure by having two discs 31, 32 at a distance from each other. Each hammer 40 comprises a wear part 42 and a support shaft 41. The wear part 42 hammers the material 1*b*. The support shaft 41 connects the wear part 42 to the upper rotor 30. The support shafts 41 are connected from a lower position to the first disc 31. A second disc 32 is above the first disc 31 and the support shafts 41 are connected from an upper position to the second disc 32. In one exemplary embodiment a single hammer 40 weighs 40 kilograms and rotates at 1000 rpm at a 1200 mm radius. Having two vertical support positions allows the hammers 40 and the upper rotor 30 to rotate without deforming under the vigorous conditions of crushing heavy and solid particles. The exemplary embodiment is configured for steel slag with 0 . . . 30 mm particle size and other materials particle size up to 50 mm. An exemplary material processing capacity is 300 tonnes per hour.

Figure 2:
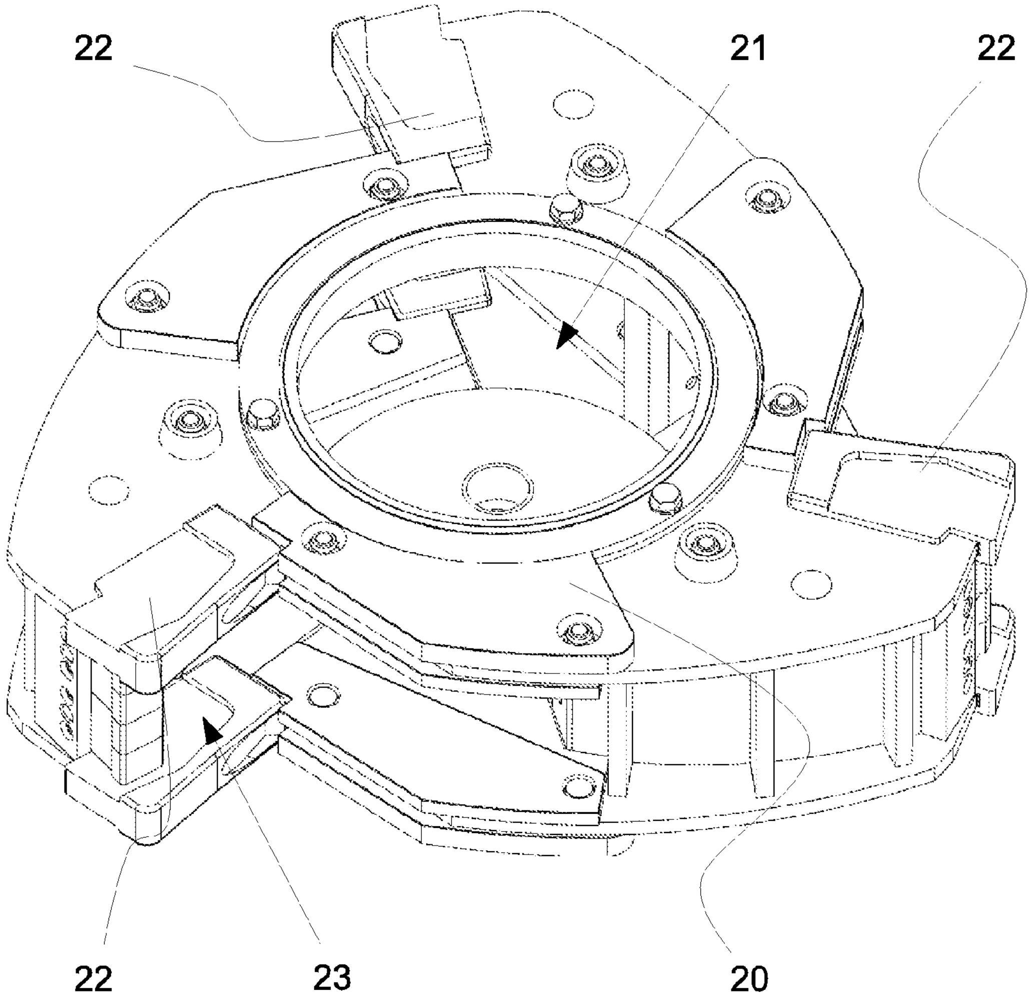
FIG. 2 illustrates an isometric view of one exemplary embodiment of a lower rotor.

FIG. 2 illustrates an isometric view of one exemplary embodiment of the lower rotor 20. The lower rotor 20 is configured to receive the material flow 1*a* via an opening 21, which is open upwards, facing the hollow portion of the vertical shaft 10. The lower rotor 20 according to the present embodiment comprises three wings 22 leading to discharge openings 23. The opening angle may be between 50° . . . 70°. Diameter of the lower rotor 20 may be 700-1400 mm. The structure of the lower rotor 20 comprises a closed top portion of the wings 22. The wings 22 guide the flow of material 1*a* to the wide discharge opening 23, which prevents packing or clumping of the material 1*b* into tight spots or corners. Before exiting though the discharge opening 23 the material 1*b* may be ejected by a wear tip. In one embodiment the wear tip is replaceable. In one embodiment the wear tip causes an impact to the material 1*b*.

Figure 3:
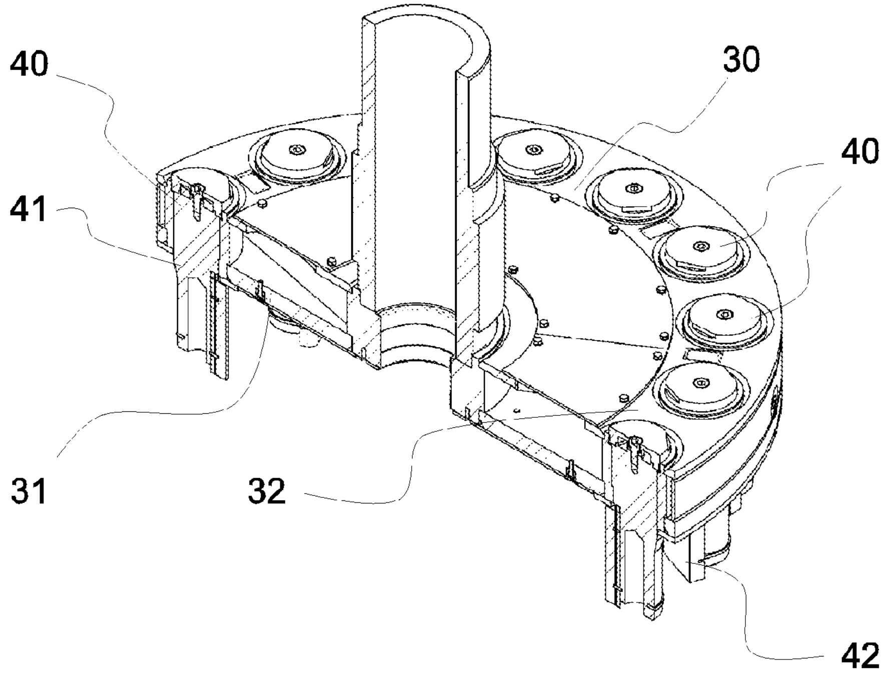
FIG. 3 illustrates an isometric sectional view of one exemplary embodiment of an upper rotor.
Figure 4A:
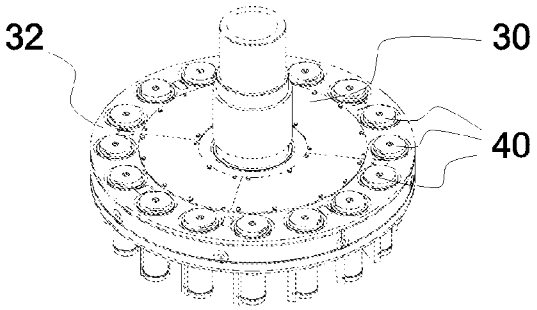
FIG. 4*a* illustrates an isometric view from above of the same embodiment of the upper rotor.
Figure 4B:
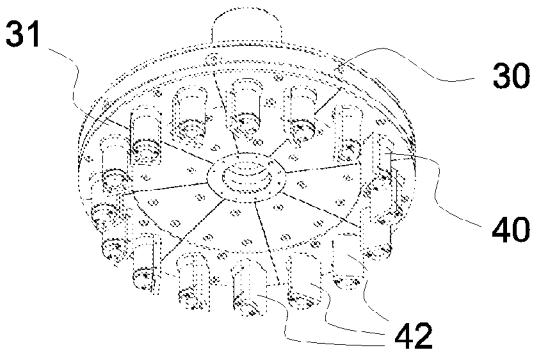
FIG. 4*b* illustrates an isometric view from above of the same embodiment of the upper rotor.

FIG. 3 illustrates an isometric sectional view of one exemplary embodiment of an upper rotor 30. FIG. 4*a* illustrates an isometric view of the same upper rotor 30 from above and FIG. 4*b* from below. The support shaft 41 of the hammer 40 is connected to the first disc 31 and to the second disc 32 according to the sandwich structure of the upper rotor 30. The first disc 31 and the second disc 32 are above the lower rotor 20. The first disc 31, when fully assembled, extends to the vertical shaft 10. The second disc 32, when fully assembled, extends to the vertical shaft 10. The first disc 31 and/or the second disc 32 may be assembled from multiple components, such as sectors. The second rotor 30 may comprise additional support structures, such as a frame supporting the first disc 31 and/or the second disc 32. The distance between first disc 31 and/or the second disc 32 provides two connection points to the support shaft, enabling structural integrity to withstand the centrifugal forces and impacts when crushing the material 1*b*.

In one alternative embodiment the first disc 31 is connected to the bottom portion of the support shaft 41. In one embodiment the first disc 31 is a hoop or a rim connected only to consecutive support shafts 41. The plurality of hammers 40 are connected towards the axis 12 only via the second disc 32. The first disc 31 may be at the level of the lower rotor 20, supporting the support shafts 41 from below. The first disc 31 is arranged as the hoop, configured to oppose the centrifugal force and to retain the hammers 40 in place, when the upper rotor 30 rotates.

In one alternative embodiment the distance between the first disc 31 and second disc 32 is designed to be smaller as the plurality of hammers 40 are interconnected with the hoop or rim from the bottom portion of the hammers 40. The hoop is in this embodiment an additional component, which may be at the level of the lower rotor 20, supporting the support shafts 41 from below.

In one exemplary embodiment, the upper rotor 30 comprises a plurality of vertical impact bushings 45 between the first disc 31 and the second disc 32. Said impact bushings 45 are configured to receive the support shafts 41 of the hammers 40. The impact bushings 45 may add the structural integrity to the upper rotor 30. In one exemplary embodiment, the support shafts 41 are configured to be pushed through the second disc 32 towards the first disc 31. The support shafts 31 may travel inside the impact bushings. The impact bushings 45 may alleviate the structural tensions.

Figure 5:
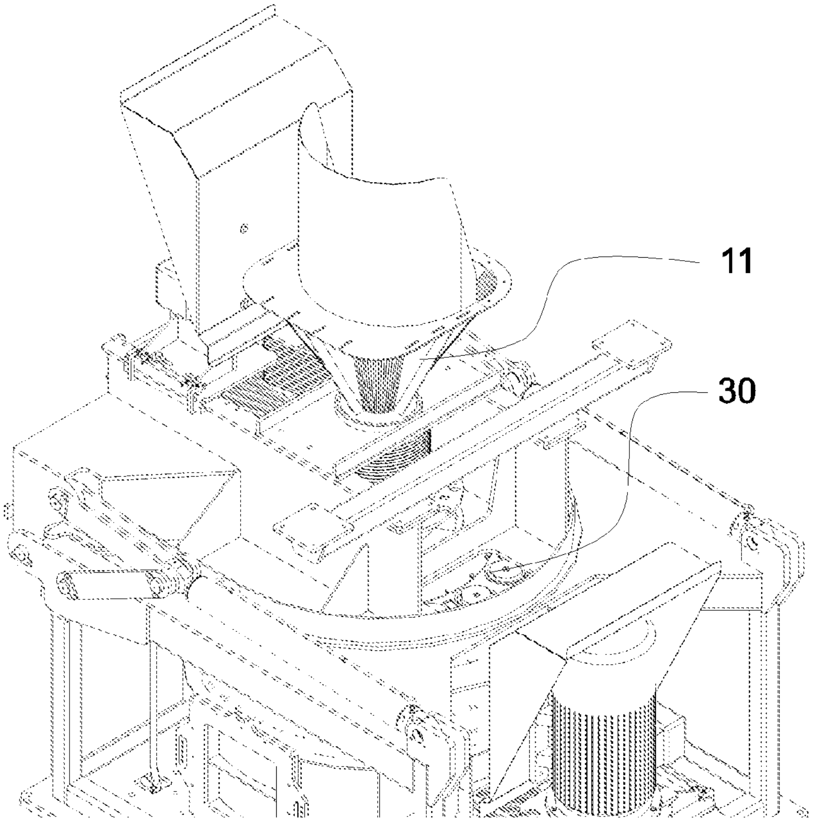
FIG. 5 illustrates an isometric view of one exemplary embodiment in a crushing position.
Figure 6:
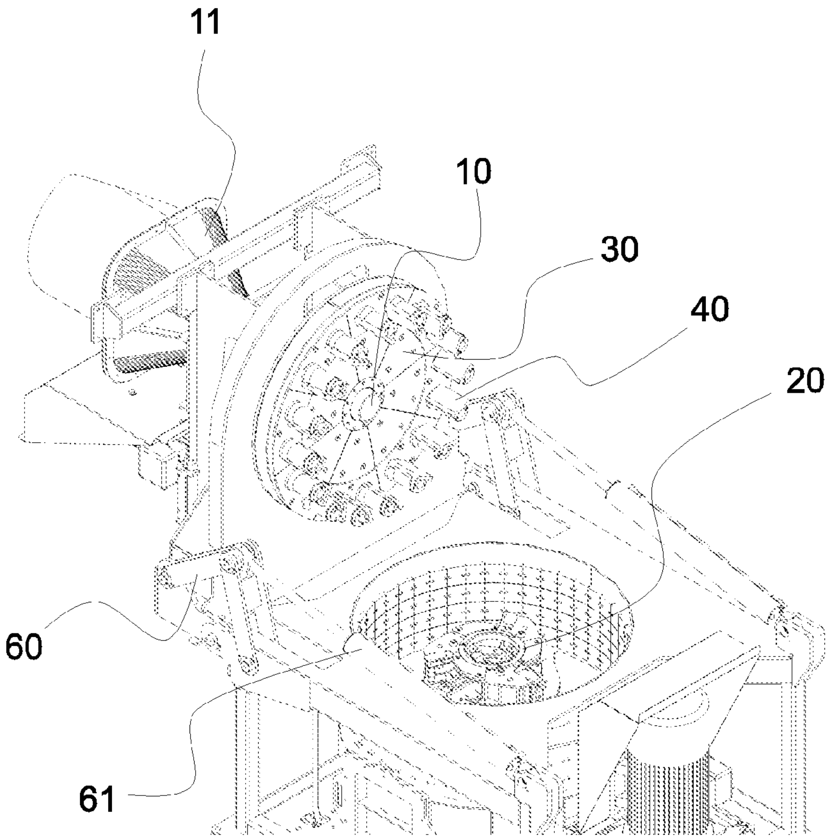
FIG. 6 illustrates an isometric view of one exemplary embodiment in service position of 90°.

The structure of the upper rotor 30 is lighter, when compared to flat upper rotor 30 without the sandwich structure. In one exemplary embodiment, the upper rotor 30 tilts between a crushing position and a service position. FIG. 5 illustrates one exemplary embodiment of the upper rotor 30 in a crushing position, as it is lowered onto the lower rotor 20 and the hammers 40 enter into a closed crushing chamber. The embodiment discloses a maintenance hatch, through which the support shafts 41 may be checked and/or replaced. FIG. 6 illustrates one exemplary embodiment, having the service position in the upper rotor 30 being tilted 90°. The upper rotor 30 is tilted by arms 60 and hydraulic cylinders 61 along a wide angle joint. These examples are not limiting in terms of tilt angles, as various angles for the service position are possible, depending on the maintenance task. The hammers 40 are in this service position horizontally. According to one example, this service position may be beneficial for balancing the upper rotor 30 or tightening the bolts on either side of the upper rotor 30.

Figure 7:
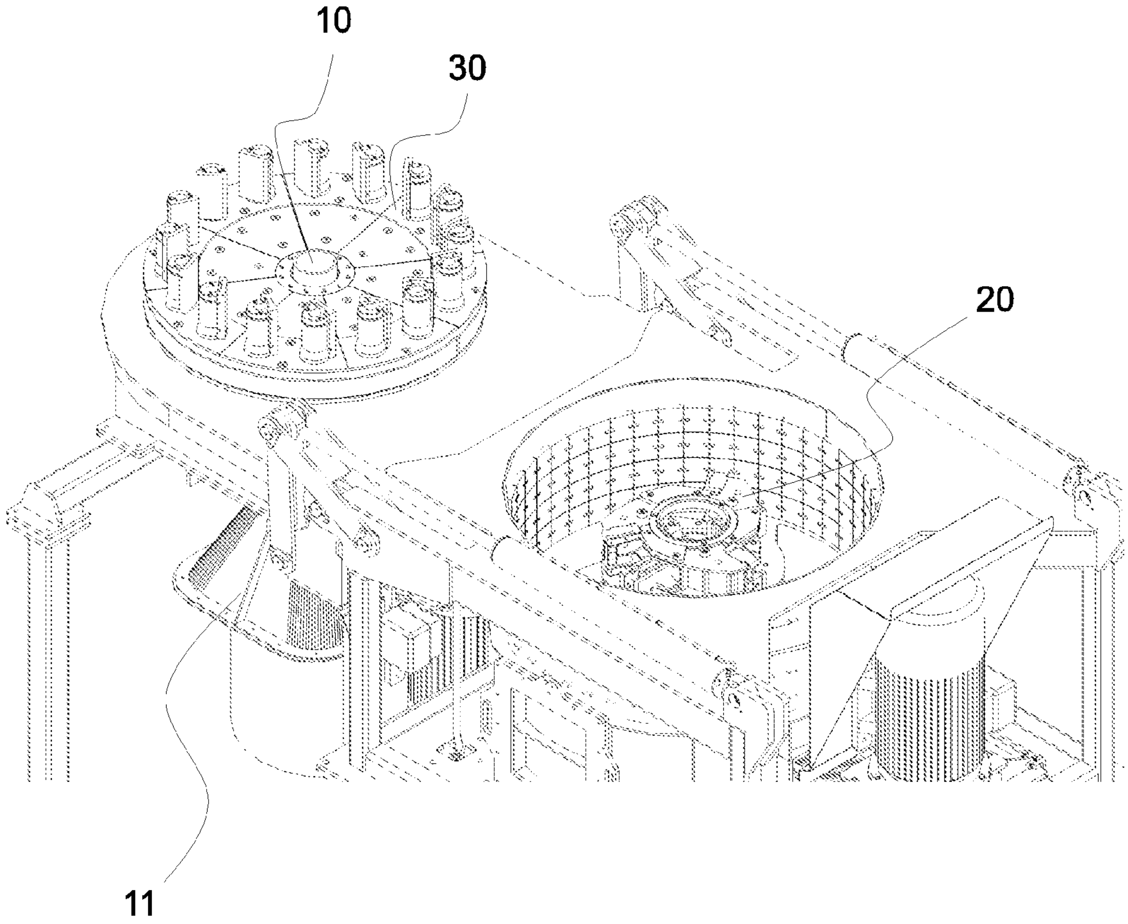
FIG. 7 illustrates an isometric view of one exemplary embodiment in service position of 180°.

FIG. 7 illustrates an isometric view of one exemplary embodiment in service position of 180°. The hammers 40 may weigh 10 . . . 100 kilograms. They may be removed or installed via the first disc 31 and fastened by a bolt that is tightened via the second disc 32, below the upper rotor 30 in this service position. Alternatively, the hammers 40 may be removed or installed via the second disc 32.

Figure 8:
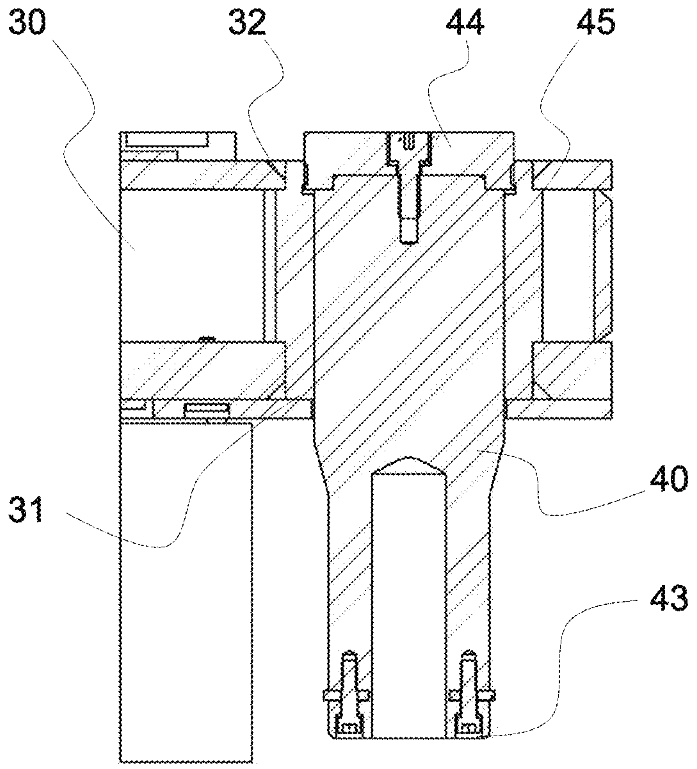
FIG. 8 illustrates a cross-sectional view of one exemplary embodiment of a hammer assembly.
Figure 9:
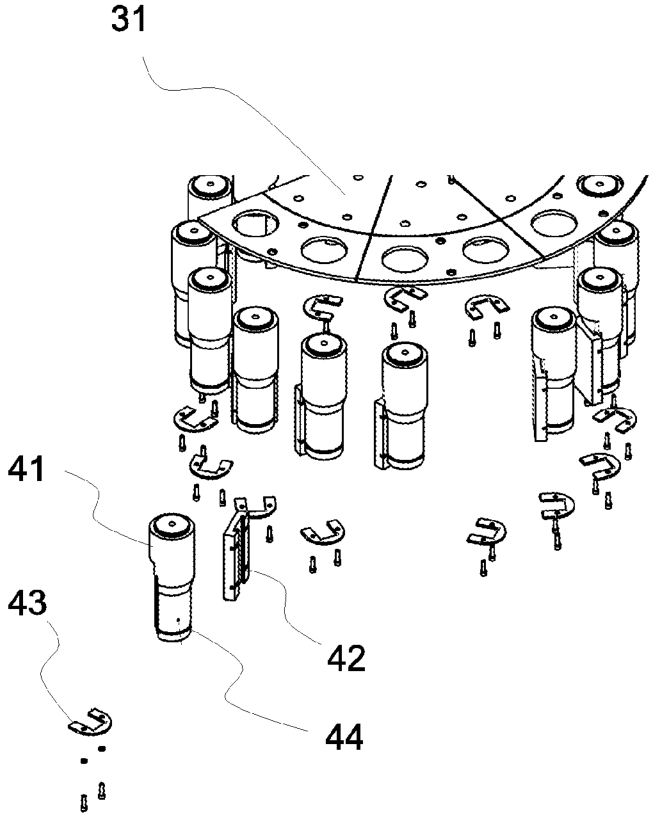
FIG. 9 illustrates an exploded view of the same embodiment of the hammer assembly.

FIG. 8 illustrates a cross-sectional view of one exemplary embodiment of the hammer 40 being assembled into the upper rotor 30. FIG. 9 illustrates an exploded view of the same embodiment of the hammer assembly. The upper rotor 30 comprises a plurality of profile shaped openings configured to receive the plurality of support shafts 41. In one embodiment the support shaft 41 is constructed from a steel bar. The steel bar may be cut and machined to shape the support shaft 41. The support shaft 41 comprises a profile shape to match the profile shaped opening. When installing the hammers 40, the orientation or the direction of the wear parts 42 is defined by the shape of the opening and the support shaft 41. In one exemplary embodiment, the profile shaped opening is arranged to the inner surface of the impact bushing 45. The combination of profile shaped openings, impact bushings 45 and shaped support shafts 41 provide increased rigidity to the upper rotor 30, while being lightweight and easy to manufacture.

In one embodiment, the wear parts 42 are replaceable. In one embodiment, the wear part 42 facing the lower rotor 20 is reversibly connected to the support shaft 41. The discharge of material **1*b* may not be even, most impacts may end up in the lower portion of the wear part. In one embodiment, the wear part 42 is non-reversible. In one embodiment the support shaft 41 comprises at least one vertical groove configured to receive at least one lip of the wear part 42, wherein said groove is configured to hold the wear part 42 laterally in place. The wear part 42 is locked horizontally in place by a collar 43. When installing the wear part 42, it is slid along the vertical groove into the end position or into contact with the first disc 31. The collar 43 is slid according to a horizontal groove 44 configured onto the support shaft 41 into matching slot or other corresponding form configured into the wear part 42. The collar 43 may be fastened into the support shaft 41 by bolts. When reversing the wear part 42, the collar 43 is removed, the wear part 42 slid off the groove. The wear part may be turned upside down and installed back into the support shaft 41. Alternatively, or in addition, the wear part 42** may be connected to the support shaft by a connecting bolt.

The support shafts 41 are tightened from the side of the second disc 32, using a washer and a single bolt. The actual mounting direction may depend on the service position. The hammer assembly is simple and quick to service.

Figure 10:
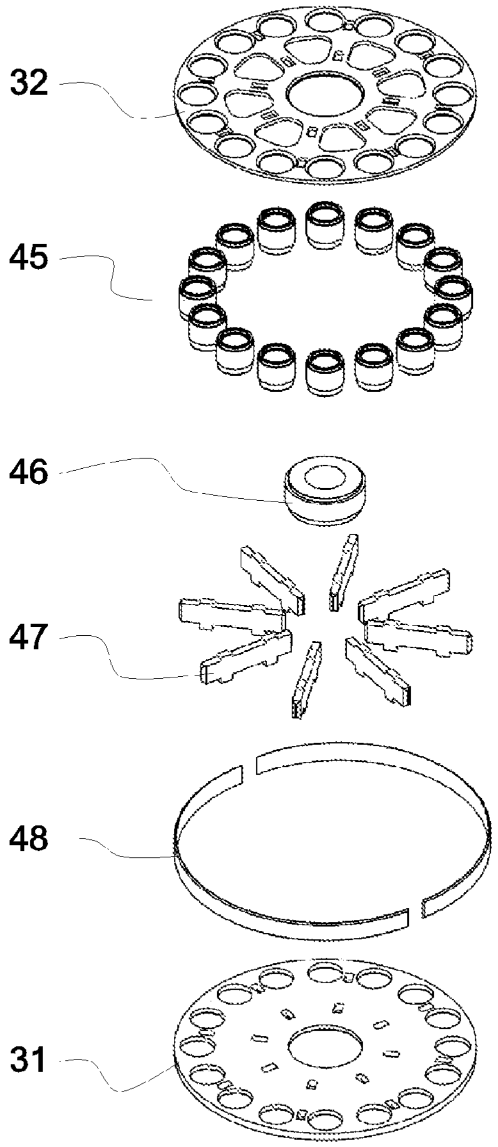
FIG. 10 illustrates an exploded view of one exemplary embodiment of the upper rotor.

FIG. 10 illustrates an exploded view of one exemplary embodiment of the upper rotor 30. A center piece 46 is configured to be connected to the vertical shaft 10. In one embodiment, the center piece 46 and the vertical shaft 10 are configured to comprise a shape locked connection. The inner surface of the center piece 46 is not perfectly cylindrical, whereas the outer surface of the vertical shaft 10 has a matching shape. The shape locked connection improves the connection and carries at least portion of the stress from the connecting bolts between the center piece 46 and the vertical shaft 10. Between the first ring 31 and the second ring 32 are multiple radial flanges 47, configured to stiffen the upper rotor 30. The radial flanges 45 may reside between each impact bushings 45 or between some of the impact bushings 45. As illustrated in FIG. 8, the impact bushings 45 are arranged between the first disc 31 and the second disc 32. An outer ring 48 covers the inner structure of the upper rotor 30.

An impact crusher is disclosed herein. The impact crusher comprises a vertical shaft configured to receive a flow of material to be crushed; a lower rotor having a vertical axis, configured to receive the material from the vertical shaft and to rotate to a first direction about the vertical axis for accelerating the flow of material; an upper rotor configured to rotate above the lower rotor to a second direction about the same vertical axis; said upper rotor comprising a plurality of hammers extending down to rotate at the level of the accelerated flow of material. The upper rotor comprises a first disc; the plurality of hammers comprising a wear part and a support shaft, wherein the support shafts are connected from a lower position to the first disc; and a second disc at a distance above the first disc; wherein the support shafts are connected from an upper position to the second disc. In one exemplary embodiment, the upper rotor is configured to be tilted into a service position. In one exemplary embodiment, in that the service position is tilted 180 degrees or 90 degrees from a crushing position. In one exemplary embodiment, the support shaft of the hammer is configured to be pushed through the second disc towards the first disc. In one exemplary embodiment, the upper rotor comprises a plurality of impact bushings between the first disc and the second disc, configured to receive the support shaft of the hammer. In one exemplary embodiment, the upper rotor comprises a plurality of profile shaped openings configured to receive the plurality of support shafts, wherein the support shaft comprises a profile shape to match the profile shaped opening. In one exemplary embodiment, the upper rotor comprises multiple radial flanges between the first disc and the second disc. In one exemplary embodiment, the wear part facing the lower rotor is reversibly connected to the support shaft. In one exemplary embodiment, the support shaft comprises at least one vertical groove configured to receive at least one lip of the wear part, wherein said groove is configured to hold the wear part laterally in place; and wherein the wear part is locked horizontally in place by a collar.

Alternatively, or in addition, an upper rotor for an impact crusher is disclosed, comprising a vertical shaft configured to receive a flow of material to be crushed; wherein the upper rotor is configured to rotate above a lower rotor; and comprising a plurality of hammers extending down to rotate at the level of the accelerated flow of material discharged from the lower rotor. The upper rotor comprises a first disc; the plurality of hammers comprising a wear part and a support shaft, wherein the support shafts are connected from a lower position to the first disc; and a second disc at a distance above the first disc; wherein the support shafts are connected from an upper position to the second disc. In one exemplary embodiment, the upper rotor is configured to be tilted into a service position of 180 degrees or 90 degrees from a crushing position. In one exemplary embodiment, the support shaft of the hammer is configured to be pushed through the second disc towards the first disc. In one exemplary embodiment, the upper rotor comprises a plurality of impact bushings between the first disc and the second disc, configured to receive the support shaft of the hammer; and multiple radial flanges between the first disc and the second disc. In one exemplary embodiment, the upper rotor comprises a plurality of profile shaped openings configured to receive the plurality of support shafts, wherein the support shaft comprises a profile shape to match the profile shaped opening.

Alternatively, or in addition, a hammer for a impact crusher disclosed hereinbefore is disclosed. The hammer comprises a wear part facing the lower rotor being reversibly connected to the support shaft. In one exemplary embodiment, the support shaft comprises at least one vertical groove configured to receive at least one lip of the wear part, wherein said groove is configured to hold the wear part laterally in place; and wherein the wear part is locked horizontally in place by a collar.

Any range or device value given herein may be extended or altered without losing the effect sought.

Although at least a portion of the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term 'comprising' is used herein to mean including the elements identified, but that such blocks or elements do not comprise an exclusive list and an apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An impact crusher, comprising:
- a vertical shaft configured to receive a flow of material to be crushed;
- a lower rotor having a vertical axis, configured to receive the material from the vertical shaft and to rotate to a first direction about the vertical axis for accelerating the flow of material;
- an upper rotor configured to rotate above the lower rotor to a second direction about the same vertical axis;
- said upper rotor comprising a plurality of hammers extending down to rotate at the level of the accelerated flow of material;
- the upper rotor comprising:
- a first disc;
- the plurality of hammers comprising a wear part and a support shaft, wherein the support shafts are connected from a lower position to the first disc; and
- a second disc at a distance above the first disc, wherein the support shafts are connected from an upper position to the second disc.

2. The impact crusher according to claim 1, wherein the upper rotor is configured to be tilted into a service position.

3. The impact crusher according to claim 2, wherein the service position is tilted 180 degrees or 90 degrees from a crushing position.

4. The impact crusher according to claim 1, wherein the support shaft of the hammer is configured to be pushed through the second disc towards the first disc.

5. The impact crusher according to claim 1, wherein the upper rotor comprises a plurality of impact bushings between the first disc and the second disc, configured to receive the support shaft of the hammer.

6. The impact crusher according to claim 1, wherein the upper rotor comprises a plurality of profile shaped openings configured to receive the plurality of support shafts, wherein the support shaft comprises a profile shape to match the profile shaped opening.

7. The impact crusher according to claim 1, comprising multiple radial flanges-between the first disc and the second disc.

8. The impact crusher according to claim 1, wherein the support shaft comprises at least one vertical groove configured to receive at least one lip of the wear part, wherein said groove is configured to hold the wear part laterally in place; and wherein the wear part is locked horizontally in place by a collar.

9. An upper rotor for an impact crusher, comprising:
- a vertical shaft configured to receive a flow of material to be crushed;
- wherein the upper rotor is configured to rotate above a lower rotor; and
- comprising a plurality of hammers extending down to rotate at the level of the accelerated flow of material discharged from the lower rotor;
- a first disc;
- the plurality of hammers comprising a wear part and a support shaft, wherein the support shafts are connected from a lower position to the first disc; and
- a second disc at a distance above the first disc, wherein the support shafts are connected from an upper position to the second disc.

10. The upper rotor according to claim 9, configured to be tilted into a service position of 180 degrees or 90 degrees from a crushing position.

11. The upper rotor according to claim 9, wherein the support shaft of the hammer is configured to be pushed through the second disc towards the first disc.

12. The upper rotor according to claim 9, comprising a plurality of impact bushings between the first disc and the second disc, configured to receive the support shaft of the hammer; and multiple radial flanges between the first disc and the second disc.

13. The upper rotor according to claim 9, comprising a plurality of profile shaped openings configured to receive the plurality of support shafts, wherein the support shaft comprises a profile shape to match the profile shaped opening.

* * * * *